Patented Jan. 1, 1952

2,580,641

UNITED STATES PATENT OFFICE 2,580,641

METHOD OF PREPARING A SILICA-ZIR-
CONIUM OXIDE CATALYST FOR THE
CONVERSION OF HYDROCARBONS

John R. Bates, Swarthmore, Pa., and George R.
Bond, Jr., Paulsboro, N. J., assignors to Houdry
Process Corporation, Wilmington, Del., a corporation of Delaware No Drawing. Original application December 20,
1938, Serial No. 246,790. Divided and this application January 24, 1941, Serial No. 375,768

9 Claims. (Cl. 196—52)

The present invention relates to contact masses capable of promoting chemical reactions, especially within bitumens and their derivatives, as for example, in fluids found in or derived from petroleum, coal, shale, schist and the like, or in hydrocarbons synthesized from hydrogen and carbon monoxide. More particularly, it is concerned with catalysts having selective activity in promoting or assisting decomposition of hydrocarbon starting material. It is directed particularly toward such contact masses comprising zirconium and silica.

One object of the invention is to provide catalysts comprising actively and intimately associated silica and zirconium compounds. Another object is to prepare such catalysts under such controlled conditions that a product of controlled and high activity results. Another object is to prepare contact masses of predetermined composition comprising silica and zirconium oxide in chemically bonded relation. Other objects will be apparent from the detailed discussion which follows.

The invention involves contact masses in which silica and a zirconium compound such, for example, as an oxide, are united to form the nucleus of a zeolitic or base exchange body. The discovery has now been made that the base exchange capacity of such zeolites at the time of their preparation has direct and substantial influence over the activity of catalysts made or derived therefrom; that, in order to yield an ultimate contact mass having sufficiently high activity to be economically attractive for use in industrial or commercial scale treatment of hydrocarbons, the silica and zirconium containing zeolite must have low or comparatively low base exchange capacity which is not in excess of a predetermined upper limit. For simplicity, the base exchange capacity of these zeolites will be referred to in this specification and in the appended claims as the amount of sodium oxide which they may hold. It is to be understood, however, that base exchangeable components other than sodium oxide may be present in the zeolitic body at one or more stages of its preparation or use in equivalent amounts determined by the molecular weight of such components.

Silica-zirconium oxide zeolitic nuclei intended for use as or in contact masses having the high catalytic activity contemplated in this invention must be capable of exchangeably holding no more and preferably substantially less than 2% by weight of sodium oxide. Usually, catalysts having the best activity are made from such nuclei which are capable of zeolitically combining with less than 1.5% by weight of sodium oxide, as for example, of the order of 1% or below. When the zeolitic capacity of chemically bonded silica and zirconium exceeds the 2% limit set forth above, the contact mass ceases to be capable of promoting formation of sufficiently high yields of valuable reaction products, for example, high octane gasolines obtained by transformation of higher boiling hydrocarbons or of low anti-knock naphthas and the like, to be attractive for commercial scale operations when due consideration is made of the industrial problems involved. Such problems include the cost of the raw materials for making the catalyst and especially of the expensive zirconium containing ingredients, the yields and value of the products balanced against the cost and nature of the reactants, and the practical limitations of commercial operating conditions.

The special zeolites embraced within the scope of the invention are prepared to best advantage by wet methods. To this end, a solution of a soluble zirconium salt may be reacted under controlled reaction conditions with a solution of a soluble silicate to form a more or less gelatinous material which, after drying and washing in known manner, provides a finished zeolitic body. The base exchange capacity of this zeolitic body is effectively controlled and limited to the desired amount through regulation of the pH value of the gel or coagulum at the time of its formation. The base exchange capacity of the zeolite is usually within the above described 2% upper limit when the zirconium and silica containing solutions are interreacted under pH conditions of the order of 5 or below, preferred reaction products being obtained with pH values as low as or lower than 4. Since soluble silicates are highly alkaline in character and since most of the more easily obtained simple zirconium salts have low pH values, the desired pH of the combined reactant solutions may be attained by proportioning of the individual reactant solutions.

It is one of the important features of the invention, however, that only relatively minor quantities of zirconium need be present in the zeolitic nucleus to provide contact masses of high activity. Thus, the unitary contact masses of this invention preferably contain no more than about 15% by weight of nuclear zirconium which is equivalent to about 20% by weight of zirconia, the form in which the zirconium often appears in the zeolites. In fact, in many if not most instances, the low base exchange capacity silica-zirconium oxide zeolites have high activity when they contain less than 15% by weight of nuclear zirconia, as for example, of the order of 10% or less. The advantages of these low zirconium content catalysts include relatively low cost of production, for only comparatively small quantities of the expensive zirconium salts or other zirconium containing starting materials are then required for their manufacture. In order to obtain the desired pH control over the reaction between the silica and zirconium containing solutions the calculated quantity of zirconium containing solution may be supplemented by a predetermined amount of another material having a low pH value. This other material may be an acid of any desired concentration, the common inorganic acids such as hydrochloric, sulphuric and nitric acids being well suited for this purpose and having the advantage of being cheaply obtainable in any desired quantity. Such acidic material, whether it be an organic or an inorganic acid or other desired substance such as an acid salt or a chemically neutral salt capable of forming solutions of low pH value, may be added to either or both of the reacting solutions prior to their admixture, or it may be utilized to coagulate the zeolitic gel or the like to accelerate reaction between the mixed solutions. When an acid is used, as for example, hydrochloric acid, the desired amount of acid may advantageously be mixed with the zirconium containing compound prior to contacting the latter with the soluble silicate.

In dried form, and preferably after being washed free or substantially free of excess soluble reaction products such as salts, the solid zirconium and silica containing zeolite of low base exchange capacity is capable of promoting formation of high yields of valuable reaction products when contacted under suitable reaction conditions including elevated temperature with hydrocarbon charging material. The activity of such zeolites may, however, be raised to substantially higher levels by removing exchangeable alkali metal therefrom, the increase in activity usually being greater with increasing amounts of alkali metal removed. In fact, the specific activity of these catalysts may, in some instances, be increased as much as or even more than 50% by elimination or partial elimination of exchangeable alkali metal such as sodium from the zeolite. Zeolitic masses of preferred activity usually result when at least half the exchangeable alkali metal or oxide is removed so that the zeolite then contains a maximum of 1% or even of 0.5% by weight of sodium oxide.

Removal of exchangeable alkali metal may be effected in any known or desired manner. One efficient, convenient and advantageous method is to base exchange the zeolitic body with a solution of a salt containing a metallic or other cation capable of displacing the alkali metal. In this manner, any desired metal in the first to the eighth groups of the periodic table capable of assisting or promoting the desired reactions may be incorporated in highly active condition within the catalytic mass in any desired amount up to the base exchange capacity of the zeolite.

It is not necessary, however, for the active zeolitic nucleus comprising silica and zirconium to have an active or other metal exchangeably held therein for the contact mass to have excellent activity in promoting hydrocarbon reactions. In fact, contact masses comprised essentially and substantially only of the silica and zirconium containing zeolitic nucleus and being free or substantially so of non-nuclear components may be considered as preferable for promoting formation of valuable products such as high anti-knock motor fuels. Such contact masses are composed of at least 98% by weight of nuclear substance and preferably of 99% or even 99.5% of this material. This nucleus, in turn, is usually comprised of at least 80% by weight of silica and preferably substantially in excess of this, as for example, 90% by weight or more, chemically bonded with the complementary amounts of zirconium compound. The remaining 2% or less of the active mass may then comprise sodium oxide. It is to be understood that the above values of 98% by weight and 2% by weight are indicative only of the degree of purity of the active contact masses and will vary with the nature and molecular weight of the small amount of non-nuclear substance or substances present therein. If, for example, potassium oxide instead of sodium oxide comprises the non-nuclear portion of the mass, an equivalently pure mass is one comprising about 97% and 3% by weight, respectively, of nuclear and non-nuclear substances.

When it is desirable to utilize a base exchange step in preparing contact masses comprising substantially only the zeolitic nucleus free or substantially free of alkali and other exchangeable components, it is preferable to use as a base-exchanging solute a salt which is volatile or which contains a volatile cation. To this end, the zeolite, preferably in dried and washed form, may be contacted with a solution of an amino or ammonium salt, for example, ammonium chloride, until the desired amount of base exchange has taken place, as disclosed in the copending application of John R. Bates, Serial No. 170,648, filed October 23, 1937, now Patent No. 2,283,172. Following this treatment the zeolitic nucleus, depleted in its content of alkali metal, as described in the aforesaid copending application, is preferably subjected to heat treatment at elevated temperatures substantially above those necessary for drying to drive off all or substantially all the zeolitically held volatile cation, thereby to leave a final product comprising substantially only silica and a zirconium compound such as an oxide in controlled proportionate quantities and free or substantially so of exchangeable components of metallic or other nature. For such heat treatment the contact mass is maintained at predetermined temperature, preferably 400° F. for a suitable time which tends to be shorter the higher the temperature selected. Practical, commercial scale procedure is usually realized with the use of temperatures as high as or higher than 700° F., as for example, of the order of 1000° F. or somewhat higher, for times of a half hour or longer, as up to four hours or somewhat more.

The silica-zirconium containing catalysts of controlled characteristics and composition hereinbefore described may, if desired, be used directly and to advantage in hydrocarbon treating processes in granular, pulverized or any other desired physical form. In many instances, however, as for example, when it is to be subjected to regeneration as by combustion to remove coky and other deposits formed thereon or therein during its employment to promote decomposition of hydrocarbon starting material it is preferably presented to the process in the form of molded pieces of uniform size and shape. To this end, the silica-zirconium oxide zeolite may be formed or molded in any desired manner, but preferably without the use of deleterious binding agents, such for example as those rich in alkali metals or their oxides. Usually, molded contact masses having preferred characteristics including selective and controlled activity are formed when no binding agent is utilized in the molding or forming process. Strong, rugged molded pieces of catalyst may be prepared from a plastic mixture comprising a predominant proportion of dry gel and a small quantity of wet gel substantially as set forth in reissue Patent No. Re. 21,690, granted to George R. Bond, Jr., January 14, 1941. Another method which yields strong molded products is to prepare a plastic heterogeneous semi-fluid mass capable of setting to hard solid form on standing by prolonged mechanical treatment of the dried zeolite, such as grinding, mulling or the like, in the presence of a wetting agent and then extruding or casting this material in its semi-fluid condition, substantially as described in the copending application of Hurbert A. Shabaker, Serial No. 209,070, filed May 20, 1938 (issued October 27, 1942, as U. S. Patent No. 2,299,768).

In some instances, it is desirable to subject the contact mass prior to use in promoting the desired reactions to heat or other treatment under controlled conditions to temper or tone its initial activity to a predetermined and controlled level. Effective heat treatments prior to treating hydrocarbons or the like are, in practical operations, preferably conducted within the temperature range of 900 to 1150° F. In many instances, satisfactory catalysts are obtained when the zeolite is subjected to temperatures of the order of 1000° to 1100° F. for periods of one-half hour to four hours in length, as for example, to about 1000° F. for about 2 hours. Such heat treatment may be used at any desired stage of the preparation of the contact mass following recovery of the zeolitic gel, but it is preferably given after any base exchanging step and preferably follows or is part of a drying operation. When the mass is to be used in molded form, the heat treatment is preferably made on the molded pieces, for it has the effect of increasing the strength of the latter.

The following examples of the invention illustrate its value in a few of its applications.

*Example 1*

About 1000 parts by weight of $Zr(NO_3)_4 \cdot 5H_2O$ in the form of an aqueous solution of approximately 18% of strength along with about 1050 parts by weight of hydrochloric acid, as a 36% solution, were mixed with approximately 12,300 parts by weight of sodium silicate solution containing about 8.85% $Na_2O$ and 28.5% $SiO_2$ and diluted with about 58,000 parts by weight of water. The resulting mixture set to a jelly-like mass having a pH value of the order of 3.5. This mass was divided into two portions. One of these portions was dried at low temperature of the order of 210° F., and the dried solid was washed with water until substantially free of soluble salts and the like. The resulting highly porous zeolitic mass, upon analysis, was found to comprise about 88.7% by weight of $SiO_2$ in chemically bonded relation with about 10.2% by weight of $ZrO_2$. This nucleus zeolitically held about 1.1% by weight of sodium oxide. The dried material was then divided into two portions.

One of the portions of dried, washed gel was subjected to temperature conditions of about 1050° F. for approximately two hours and then, in broken form, was utilized to promote transformation of a gas oil fraction derived from an East Texas crude oil into motor fuel. In this operation, the gas oil charging stock in vapor phase and under approximately atmospheric pressure was fed to and through the reaction zone containing the catalyst at a rate of the order of 1½ volumes of liquid charge for each volume of catalyst per hour, the catalyst meanwhile being maintained at about 800° F. The resulting products were fractionated and cooled in known manner to yield a wild gas fraction, a gasoline or motor fuel fraction of about 400° F. end point and a higher boiling or residual fraction. Said motor fuel fraction was found to have an octane rating substantially in excess of 70 and was equivalent to somewhat more than 25% by volume of the charging stock, while the residual fraction was found to be clean and clear. It has substantially the same boiling range and other characteristics as the gas oil charging stock and was valuable for use as a distillate fuel or as a charging stock for further transformation of catalytic or other nature. The total volumes of the gasoline and residual fraction were equivalent to about 97% of the volume of the gas oil charge. The aforesaid wild gas fraction contained hydrogen and a substantial proportion of components within the boiling range of the above described motor fuel and amounted to only about 2.5% by weight of the original charge. An approximately equal percentage by weight of coky or carbonaceous deposit was formed within and on the porous catalyst during the operation and this deposit was subsequently removed by a burning operation in which the contact mass was maintained at controlled temperature not in excess of about 1100° F. The thus regenerated mass was reused repeatedly in on stream and regeneration steps similar to those described above and maintained high activity during such repetitious use.

To the second portion of the dried, washed silica-zirconia zeolite there was added a small quantity of the remaining jelly-like material in washed form, the dried and wet materials being so proportioned that the silica-zirconia content of the wet gel was not in excess of about 10% by weight of the total quantity of zeolite in the combined substances. This resulting combination of wet and dried materials was mixed and molded into pellet form substantially after the manner described and claimed in the aforesaid Reissue Patent 21,690. The resulting dry pellets were treated with a 10% solution of ammonium chloride until the zeolitically held sodium oxide content of the pellets was reduced to about 0.5% by weight. Following this treatment, the pellets were subjected to temperatures of the order of 1050° F. for about two hours. The resulting product which was substantially free of zeolitically held ammonium was then utilized in an operation comprising repeated and recurring cycles of alternating transformation and regeneration periods. During the on-stream periods the same charging stock and substantially the same operating conditions were used as for the first portion of the dried zeolite. The liquid products of these repeated catalytic operations amounted to about 94.5% by volume of the original feed. They were found to contain at 400° F. end point motor fuel having an octane substantially in excess of 70, equivalent in volume to about 43% of the volume of the gas oil charge, the remaining liquid being clean material having substantially the distillate characteristics and uses of the charge. The remaining small quantity of reaction products were found to be about 5% by weight of a gas containing hydrogen and hydrocarbon components boiling within the range of said motor fuel and about 3% by weight of a carbonaceous coky deposit on the contact mass.

Example 2

A silica-zirconia zeolite exchangeably holding about 1.1% of sodium oxide prepared in a manner similar to and having practically the same physical characteristics and chemical analysis as the catalyst utilized in the first cracking operation mentioned above was used to reform a low antiknock naphtha boiling substantially completely within the range of 200° to 425° F. In this operation the heated naphtha maintained under a pressure of the order of 500 lbs. per square inch was fed through a reaction zone containing this catalyst maintained in temperature at about 875° F. at a rate of about 5 volumes of liquid charge per hour to each volume of contact material. The recovered product was equivalent in volume to about 99% of the volume of the charge and had an octane rating of about 60 as compared with a value of about 46 for the charging stock.

When a catalyst of similar composition, with the exception that the exchangeably held sodium oxide had been reduced to about 0.5% by weight by treatment with a solution of ammonium chloride followed by heat treatment substantially as set forth in Example 1, was utilized under substantially the same conditions of rate, temperature and pressure in reforming another portion of the same naphtha, the reformed product had an octane number of the order of 63, yet its volume was still in excess of 97% of the volume of the original charge. As in the cracking operations described in Example 1 the catalyst following termination of each of the reforming runs had carbonaceous deposit removed therefrom by controlled combustion and was again ready for use in promoting transformation of hydrocarbon charge. In each of the above reforming operations, the quantity of such carbonaceous deposit was below 1% by weight of the charging stock and the amount of wild gas, including hydrogen and components boiling within the range of the recovered liquid naphtha was, within the limits of experimental error, substantially the same, namely, of the order of 3 to 4% by weight of the original charging stock.

It is to be understood that the above examples are illustrative only of the present invention and are intended only to indicate some processes in which the special silica-zirconium containing zeolites may be used to advantage. They find valuable application in many processes involving the treatment of hydrocarbons or their derivatives, as will be apparent to persons skilled in the art. For example, they possess a high degree of selective activity in promoting formation of valuable gaseous and other products involving decompositions and other changes in hydrocarbon starting materials of widely diversified nature, including generally those boiling below, within and above the boiling range of naphthas and the like. When decomposition reactions figure largely or to substantial extent in formation of the desired product or products, these special zeolites may be used to advantage at temperatures within the range of 700° to 1000° F., and preferably above 750° F. When the charging material is composed to substantial extent of hydrocarbons as light as or lighter than naphthas, the best results are usually obtained at temperatures of 850° F. or higher. Any desired sub-atmospheric or super-atmospheric pressure may be maintained in the reaction zone commensurate with practicable operation of the plant. It is preferable, however, but not necessary, that the reaction zone be used under such conditions of temperature and pressure that the desired reaction takes place to substantial extent in the vapor phase. These operating conditions and the rate or rates of feed capable of yielding large quantities of the desired product from a selected charging material may easily be determined by simple experimentation.

It is to be noted in the above examples that high yields of the more desirable and more valuable products were realized with very little loss of the charging stock to undesirable by-products of coky or carbonaceous nature. Moreover, when the activities of the silica-zirconium containing zeolites were substantially increased by removal of exchangeable alkali metal, the yield or antiknock rating of the desired motor fuel products were increased without the sacrifice of substantially increased amounts of the charging stock to less valuable products. These advantages are typical of the zeolites of predetermined and controlled composition described and discussed herein; they permit important economies of operation, including low losses of the charging stock to by-products of little or no commercial value and short periods when the contact mass is productively inactive, i. e. when it is being periodically subjected to regeneration to remove the small amounts of carbonaceous and other deposits formed therein or thereon during the transformation or reaction periods.

This application is a division of our copending application Serial No. 246,790, filed December 20, 1938, now abandoned.

We declare that what we claim is:

1. In the promoted formation of valuable reaction products involving decomposition of hydrocarbon starting material, the process comprising contacting said starting material under decomposing reaction conditions with an active catalyst comprising a zeolitic nucleus incapable of exchangeably holding more than 2% by weight of sodium oxide, said nucleus having been prepared from a coagulum formed by interreaction of a soluble silicate and a zirconium salt under pH conditions not in excess of 5, and consisting of substantially pure chemically bonded silica and zirconium oxide, said silica comprising at least 85% of the weight of said nucleus.

2. Process according to claim 1 wherein the contact mass comprises substantially only the nucleus of the zeolite associated with exchangeable components in an amount not in excess of that equivalent to 1% by weight of sodium oxide.

3. In the preparation of contact masses capable of promoting chemical reactions, the process comprising interreacting a soluble silicate solution with a solution of a soluble zirconium salt under conditions including a controlled pH value not in excess of 5 to yield a zeolitic coagulum, and drying and washing said coagulum thereby to yield an adsorptive zeolitic solid comprising a nucleus of silica and a zirconium compound having a base exchange capacity not in excess of 2% by weight of sodium oxide.

4. In the preparation of contact masses of controlled and predetermined composition capable of promoting hydrocarbon decomposition reactions, the process comprising interreacting solutions of a soluble silicate and zirconium salt in the presence of an acid to form a zeolitic coagulum, reducing the latter to dry, hard, porous and purified condition by drying and washing operations, so proportioning the said silicate and salt solutions with respect to each other that the aforesaid dried and washed coagulum contains no more than 20% by weight of zirconium oxide, and regulating the amount of said acid to yield a reaction mixture having a pH value not in excess of 4, thereby to yield a dried zeolite containing a minor quantity of zirconium and incapable of exchangeably holding more than 2% by weight of sodium oxide.

5. In the preparation of contact masses capable of promoting chemical reactions, the process comprising interreacting a soluble silicate solution with a solution of a soluble zirconium salt under conditions including a controlled pH value not in excess of 5 such that a zeolitic coagulum is formed, reducing said coagulum to hard, porous solid, purified form by drying and washing steps, and subjecting said coagulum to base exchange with a salt solution until at least half of the exchangeably held alkali metal oxide is replaced by another cation, thereby to yield an active mass consisting of silica and zirconium oxide substantially free of exchangeably held alkali metal oxide.

6. In the preparation of contact masses of controlled and predetermined composition capable of promoting hydrocarbon decomposition reactions, the process comprising interreacting solutions of a soluble silicate and a zirconium salt in the presence of an acid to form a zeolitic coagulum, reducing the latter to dry, hard, porous and purified condition by drying and washing operations, so proportioning the said silicate and salt solutions with respect to each other that the aforesaid dried and washed coagulum contains no more than 20% by weight of zirconium oxide, regulating the amount of said acid to yield a reaction mixture having a pH value not in excess of 5, subjecting said dried and purified coagulum to base exchange with a solution containing an exchangeable volatile cation until said volatile cation replaces at least half the exchangeably held alkali metal oxide, subjecting the thus treated zeolite to suitable elevated temperature conditions until substantially all said volatile cation is driven off, thereby to yield an active catalyst comprising substantially only a zeolitic nucleus consisting of at least 80% by weight of silica chemically bonded with a minor quantity of zirconium oxide.

7. In the production of valuable hydrocarbon products by catalytic transformation the process of subjecting hydrocarbon starting material at reaction conditions to the action of a contact mass comprising the nucleus of a silica-zirconium oxide zeolite incapable of zeolitically holding more than 2% by weight of sodium oxide and containing at least 80% by weight of silica, said mass resulting from removal of excess alkali metal by base exchange from a zeolite formed by coprecipitation reactions at a pH not in excess of 5 between a soluble silicate and a soluble zirconium salt.

8. In the promoted formation of valuable hydrocarbons by decomposition, the process of subjecting hydrocarbon starting material under decomposition conditions to the action of a catalyst comprising silica and zirconium oxide, obtained by coprecipitating these substances at a pH not in excess of 5 and as a zeolite whose base exchange capacity is limited to a maximum of 2% by weight of sodium oxide, base exchanging the resulting zeolite with a solution of a salt containing a volatile cation until its content of alkali metal is reduced by at least half, and thereafter heating the base exchanged zeolite to drive off said volatile cation.

9. In the promoted formation of valuable decomposition products from hydrocarbon starting material the process of contacting hydrocarbon starting material under decomposition conditions with a catalyst comprising a zeolitic coagulum prepared by interreaction of a soluble silicate and a zirconium salt under pH conditions not in excess of 5.

JOHN R. BATES.
GEORGE R. BOND, JR.

REFERENCES CITED

The following references are of record in the file of this patent:

UNITED STATES PATENTS

| Number | Name | Date |
|---|---|---|
| 1,840,450 | Jaeger et al. | Jan. 12, 1932 |
| 2,083,895 | Connolly | June 15, 1937 |
| 2,137,492 | Hyman | Nov. 22, 1938 |
| 2,215,305 | Voorhies, Jr. | Sept. 17, 1940 |
| 2,248,357 | Kanhofer | July 8, 1941 |
| 2,275,441 | Kanhofer | Mar. 10, 1942 |
| 2,297,773 | Kanhofer | Oct. 6, 1942 |
| 2,382,239 | Lee | Aug. 14, 1945 |

FOREIGN PATENTS

| Number | Country | Date |
|---|---|---|
| 392,954 | Great Britain | May 22, 1933 |